Figures 1, 2:
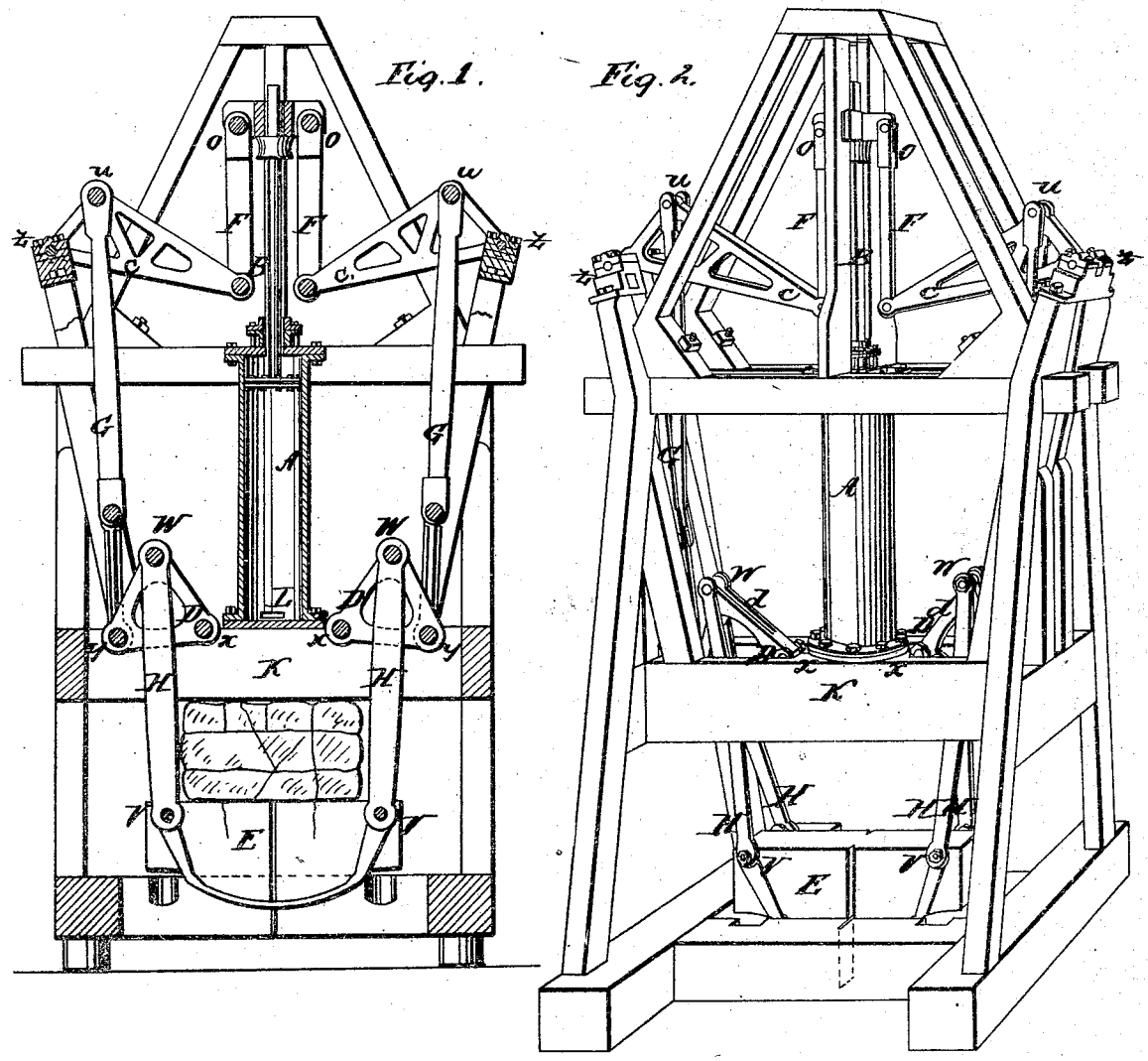

A. Devall,
Cotton Press.
Nº 5,067. Patented Apr. 17, 1847.

UNITED STATES PATENT OFFICE.

AUGUSTUS DEVALL, OF NEW ORLEANS, LOUISIANA.

IMPROVEMENT IN COTTON-PRESSES.

Specification forming part of Letters Patent No. 5,067, dated April 17, 1847.

*To all whom it may concern:*

Be it known that I, AUGUSTUS DEVALL, of the city of New Orleans, parish of Orleans, and State of Louisiana, have invented a new and Improved Mode of Compressing Cotton-Bales; and I do hereby declare that the following is a full and exact description thereof.

The nature of my invention consists in the direct application of steam-power to a combination of levers.

To enable others skilled in the art to make and use my invention, I will proceed to describe its construction and operation.

I construct my frame in any form suitable to the machinery to be used, which machinery I shall now describe as presented in Figure 1 of the accompanying drawings.

A is the steam-cylinder; B, piston-rod; C C, levers working in journals at $z\ z$; D D, equidistant triangles working upon journals at $x\ x$; F F, arms connecting levers C C with piston-rod B at $o\ o$; G G, arms connecting levers C C with triangles D D at $y\ y$; H H, arms connecting triangles D D with the platen at $v\ v$; L, double valve for the admission and escapement of steam; E, the platen; K, beam on which the cylinder stands.

The bale of cotton is placed upon the platen E. Steam is then introduced to the cylinder A at the valve L, which forces the piston-rod B to ascend, drawing with it the levers C C by means of the connecting-arms F F, and the triangles D D, being connected with arms C C at $u\ u$ by the arms G G, are forced up, turning upon their journals at $x\ x$, and the platen E, being attached to the triangles D D at $w\ w$ by means of the arms H H, rises perpendicularly, and thus presses the bale between itself and the beam K. When the bale is tied, the steam is let off at valve L, and the resistance of the bale causes the machinery to descend, and its own weight carries it to its original position. The triangles are double, as at $d\ d$, Fig. 2, so that the arms G G, when the machinery is in operation, pass between the arms H H. These triangular levers operate in the first instance as levers of the third order until the arms G G pass the joints of the arms H H at $w\ w$, when they assume the character of levers of the second order, and then commences the increase of power, and it is only then that the resistance of the bale commences, for the space between the platen E and the beam K is four feet six inches. The actual size of the bale when first introduced is about three feet, so that the platen moves up about eighteen inches before there is any resistance. It then continues up eighteen inches farther, when it ceases to operate, making its whole upward movement three feet, which leaves the bale when pressed eighteen inches. The increase of power is rapid so soon as the triangles assume the second order of lever-power, and then only is it required.

What I claim as my invention, and desire to secure by Letters Patent, is—

The application of equilateral triangular levers, (D D, as per drawings,) in combination with ordinary levers of the second order, (C C, as per drawings,) the latter to be operated upon by direct application of steam-power, for the purpose of compressing cotton-bales in such a manner that the increase of power by means of the combination shall be equal to the increased resistance of the bale of cotton undergoing the pressure necessary to reduce it to as small a compass as may be required.

I refer to the drawings now in possession of the Department and to the specification above, Fig. 1 representing a part section; Fig. 2, a perspective view.

A. DEVALL.

Witnesses:
P. SNELL,
W. KUHLO.